April 5, 1949.  B. A. VUILLE  2,466,627
ELECTROMAGNETIC ESCAPEMENT MECHANISM
Original Filed Aug. 14, 1944

Inventor,
B. A. Vuille
By
Young, Emery + Thompson
Attys.

Patented Apr. 5, 1949

2,466,627

UNITED STATES PATENT OFFICE 2,466,627

ELECTROMAGNETIC ESCAPEMENT MECHANISM

Bernard André Vuille, Watford, England, assignor to Watford Electric & Manufacturing Company Limited, Watford, Hertfordshire, England, a British company Original application August 14, 1944, Serial No. 549,431. Divided and this application January 29, 1946, Serial No. 644,135. In Great Britain August 6, 1943

5 Claims. (Cl. 172—36)

This invention relates to electromagnetic escapement mechanism. The present application is a division of my copending application Serial No. 549,431, filed August 14, 1944.

The invention is concerned with escapement mechanisms of the kind comprising a rotatable toothed wheel and two electromagnets mounted adjacent the periphery of the wheels so that when the poles of either one of the magnets register with teeth of the wheel the poles of the other register with teeth gaps of the wheel. The magnets are energised alternately and the energised magnet turns the wheel until two of its teeth register with the poles of that magnet and then hold it in that position. Thus each time one magnet is de-energised and the other energised, the wheel is turned or escapes one step and held in its new position. The wheel is thus rotated at a speed proportional to the frequency of the alternation of energisation of the magnets and to an extent proportional to the number of alternations. In the elementary form of this mechanism, the direction of rotation is indeterminate and it has been proposed so to shape the teeth of the wheel and the poles of the magnet that, when the wheel is held by the energised magnet, each pole of the other magnet is closer to the tooth on one side of the tooth-gap opposite it than to the tooth of the other side. Each magnet thus has a bias to turn the wheel in one and the same direction but this bias is dependent on the energised magnet holding the wheel in a definite position of rest and the arrangement is only suitable when the torque opposing rotation of the wheel is very small, approximating to a no load condition.

One object of this invention is to provide an electromagnetic escapement mechanism of the above kind having improved means for ensuring that the toothed wheel rotates in the correct direction.

Another object of this invention is to provide means for resetting the escapement mechanism to a start position.

According to the present invention, an escapement mechanism of the above kind comprises means biassing the toothed wheel to rotate continuously in one direction. The wheel is thus biassed to rotate in the required direction even if the wheel should come to rest short of its correct position of rest owing to a retarding torque. The arrangement is thus suitable for use when the wheel has to transmit a substantial torque.

Preferably the circumferential dimension of each tooth and tooth-space of the wheel is greater than the corresponding dimension of the end of each pole of each magnet, whereby each tooth in register with a pole will lead that pole in the direction of rotation of the wheel owing to the bias in the wheel. This has the result that each pole in register with a tooth-gap will be nearer the tooth on one side of that gap than the tooth on the other side so as to provide a further bias for the wheel to rotate in the proper direction.

Preferably the means biassing the wheel to rotate is an induction motor coupled to it to drive it.

The present escapement mechanism is suitable for stepping round a rotatable part that has to be reset, periodically, to a start position and it is a feature of this invention to provide means for opening the circuit of the electromagnet or both of them, so that the wheel is turned continuously, which means is operable by the said rotatable part to reclose the circuit of the electromagnet, or one of them, when the part reaches its start position, so that the wheel is again held.

The present escapement mechanism may be used for many purposes including the stepping of a part at a rate controlled electrically, as an integrating mechanism or as a counter, as a clock and as a receiver in a remote control apparatus or the like.

A construction in accordance with this invention will now be described, by way of example only, with reference to the accompanying drawings in which:

Figure 1 is a diagram showing the escapement mechanism and associated circuits, and Figure 2 shows a modification of the associated circuits.

The escapement mechanism 310 (Figure 1) will be described in its application to the apparatus for controlling the maximum demand of an electricity-consuming plant described in United States Patent No. 2,348,058. The escapement mechanism is controlled by a pair of contacts LIG that are closed intermittently by a cam 54 that forms part of an electric meter indicated by the rectangle 370 which corresponds to the cam 54 shown in Figure 1a of the prior patent. As described in the prior specification the meter 370 operates to close the contacts LIG intermittently at a rate proportional to the instantaneous load taken by the plant. The escapement mechanism is operated by the electrical impulses transmitted to it through the contacts LIG to escape at a rate determined by the rate at which the impulses are transmitted to it and steps a contact arm 334 round at a corresponding rate to displace it from one end of a resistance RL. The arm is restored to its initial position periodically and connects a contact ring 335 to a point on the resistance. Thus the part of the resistance RL between the point engaged by the contact arm 334 and one end will at any time correspond to the integration of the instantaneous load with time or the energy consumed over a period while the remainder of the resistance will correspond to the difference between the energy consumed and an amount of energy represented by the total resistance RL. The resistance RL, contact arm 334 and ring 335 form a potentiometer or adjustable resistance that is employed in the apparatus in the manner of the resistance or potentiometer RL of the prior specification.

The escapement mechanism may also be employed to control the resistance or potentiometer RT of the prior patent under the control of contacts TIG shown in the prior patent there being no difference in construction and the operation differing only in that the contacts TIG are closed at a uniform rate instead of at a variable rate.

The escapement mechanism 310 comprises a spindle 312 mounted to rotate in a suitable frame (not shown) and carrying an induction disc 313. Two spaced electromagnets 314 having shaded poles 315 co-operate with the disc and are energised by alternating current over lines 318 so that the magnets and the disc form an induction motor driving the spindle 312 in one direction as shown by the arrow. A third electromagnet 316 has a plain pole 317 co-operating with the disc and is energised by direct current as explained later so that it acts to brake the disc. With all three magnets energised, there is a resultant torque biassing the spindle to rotate in the direction shown by the arrows. The spindle 312 also carries a disc 319 which has equally-spaced rectangular slots 320 around its periphery so as to provide square cut teeth 321 having the same circumferential width at their ends as the slots to form a toothed wheel. A pair of diametrically opposed magnets 322 and a similar pair of magnets 323 are mounted round the toothed wheel or disc 319 and operate as escapement magnets. Each magnet 322 or 323 has two poles 324 of which the ends are less in width than the ends of the teeth 321 and which all extend close to the periphery of the disc 319 so that the magnetic circuit for each magnet 322 or 323 is from one of its poles 324 through the disc 319 to the other pole. The poles 324 of each magnet 322 or 323 are so spaced that all four poles of both magnets 322 will register simultaneously with the teeth 321 (or tooth-spaces 320) of the disc at the same time as the four poles 324 of the magnets 323 register with tooth-spaces 320 (or teeth 321) of the disc.

The magnets 322 and 323 are connected in a circuit which extends from a positive supply line 325 through relay contacts 326c and a line 327, and then in parallel through a resistance R30, a line 354 and the magnets 322 to a negative supply line 328, or through a resistance R31, a line 355 and the magnets 323 to the line 328. As shown the resistance R30 is shunted by closed contacts 329a so that the magnets 322 are fully energised, while the resistance R31 is in series with the magnets 323 which are only partially energised. The magnets 322 will thus hold the disc 319 in the position shown with the poles 324 of the magnets 322 in register with teeth 321. If the magnets 323 are now energised fully and the magnets 322 are partially de-energised the former will attract adjacent teeth under their poles and the disc 319 will move one step, that is, one half tooth-pitch, in the direction shown by the arrow. The disc rotates in this direction partly because it is biassed so to do by the induction motor 313—314—315 and also for the following reason. Since the poles 324 are smaller than the teeth 321 and the disc 319 is biassed to rotate in one direction, the teeth will tend to lead the poles of the magnets 322 as shown and the poles of the magnets 323 will each be nearer to the adjacent incoming tooth than it is to the adjacent outgoing tooth. The reduced magnetic flux in the poles of the partly energised magnets 323 will thus tend to attract the adjacent incoming teeth 321 under those poles and, thus, to ensure that the spindle will be stepped round in the correct direction and will not be reversed owing to faulty operation.

When the contacts LIG close, they complete a circuit from the positive supply through the contacts LIG and a relay coil 329 to the negative supply to energise the coil 329 which opens the contacts 329a and closes contacts 329b to shunt the resistance R31. The magnets 323 are then fully energised and the magnets 322 only partially energised. The magnetic fluxes are then such that the attraction of the poles of the magnets 323 on the adjacent trailing teeth 321 is sufficient to cause the disc 319 to move one step and bring those teeth into register with the poles of the magnets 323. When the contacts LIG reopen, the relay coil 329 is deenergised and its contacts return to the position shown so that the magnets 322 are fully energised while the magnets 323 are only partially energised and the disc 319 is moved on a second step.

The disc 319 is, thus, advanced by one step each time the contacts LIG open or close and its rate of advance is proportional to the rate at which the contacts LIG are operated and, thus, to the load taken by the consumer. It will be understood that the disc 319 is advanced by the pair of magnets 322 and the pair of magnets 323 alternately and it is not essential to energise the other pair partially as described above. It is advisable to do this both to ensure that the disc 319 is not turned backwardly as explained above and because the partially energised magnets reduce the speed of rotation of the disc which might otherwise move through more than one step at a time to produce a faulty result. Such faulty operation is further prevented by the brake magnet 316 co-operating with the induction disc 313. The magnet 316 is energised over a circuit from the supply line 325 through contacts 326a and the magnet 316 to the line 328.

The spindle 312 drives, through a reduction gear train 330, a second spindle 331 which carries cams 332 and 333 for operating contacts 332a and 333a and also carries the contact arm 334 co-operating with the resistance RL. The contact arm is thus stepped round from the position shown at a rate depending on the rate at which the escapement mechanism escapes. The contact arm is reset to its initial position as shown at the end of each of a series of metering periods by the following means.

A time switch 336 of any suitable form is installed which closes contacts 337 momentarily at the end of each metering period to complete a circuit from the supply line 325 through the contacts 337, a relay coil 326 and a resistance R32 to the line 328. The coil is energised and closes contacts 326d in parallel with the contacts 337 to hold itself energised and also opens the contacts 326c in series with the magnets 322 and 323, to de-energise them, and the contacts 326a in series with the brake magnet 316 to de-energise it. The coil also closes contacts 326b to shunt out a resistance R33 which is in series with the magnets 314 so that the magnetising current for these magnets is increased and they drive the discs 313 at high speed. The escapement mechanism is thus driven forwardly and turns the arm 334 rapidly towards its initial position shown in the drawings.

Just before the arm 334 reaches its initial position, the cam 333 recloses the contacts 333a which opened as soon as the arm 334 left its initial position. These contacts are in parallel with the contacts 326a and their closure re-energises the brake magnet 316 which retards escapement mechanism. Shortly after, the cam 332 recloses the contacts 332a which are in parallel with the coil 326 to shunt it so that it is de-energised and its holding contacts 326d reopen. The contacts 326b then reopen and the contacts 326c reclose to restore the circuits to normal.

The relay 326 has contacts 326e that have no bearing on the operation of the escapement mechanism 310 but are used to ensure that an associated mechanism does not commence to operate until the escapement mechanism 310 has been properly reset. Thus the contacts 326e may be connected in series with the contacts TIG of the prior specification aforesaid to ensure that the adjustment of the resistance or potentiometer RT of the prior specification does not commence prematurely.

In some cases it may be desirable to control the escapement mechanism from a spindle 349 that rotates at a variable speed and carries a cam which oscillates a lever 351 about a pivot 352 and the lever closes contacts 353a and 353b alternately. So long as there is a load, the contacts 353a and 353b will close alternately at a frequency corresponding to the load and will thus operate in a similar manner to the relay contacts 329a and 329b but the operation is not similar when there is no load, since either the contacts 329a or the contacts 329b will be closed, while the cam 350 may stop in such a position that the contacts 353a and 353b are both open. For this reason it is not possible to connect the contacts 353a and 353b directly to the magnets 322 and 323 through the lines 354 and 355 since all four magnets 322 and 323 would be de-energised if the cam 350 were to stop in such position that the contacts 353a and 353b were both open. The spindle 312 (Figure 1) would then be rotated continuously although it ought to be stationary.

The contacts 353a and 353b are, therefore, connected to two electromagnets 356a and 356b respectively so that the magnet 356a is energised by the closure of the contacts 353a and the magnet 356b by the contacts 353b. The magnets co-operate with a common steel armature 357 which is carried by a spindle 358 to pivot about the axis of the spindle. The spindle 358 carries a mercury switch 359 which connects the line 327 to either the line 354 or the line 355. Assuming that the contacts 353a are closed, the magnet 356a will rock the armature 357 to the position shown and the lines 327 and 355 will be connected by the switch 359. The armature 357 is magnetised and attracted should the cam 350 come to rest in the position shown after the contacts 353a open but before the contacts 353b close. Thus the circuit through the line 355 will be maintained. When the contacts 353b next close, they energise the magnet 356b which attracts the armature 357 with sufficient force to overcome the attraction of the magnet 356a for the armature so that the armature is rocked and reverses the switch 359 to connect the line 327 to the line 354. Since the attraction of the magnet 356b will increase and that of the magnet 356a will diminish as the armature rocks, it will move and rock the switch 359 with a snap-over action and this is advantageous.

The arrangement shown in Figure 2 should also be used when the meter includes change-over contacts, such as the contacts 353a and 353b, that take longer to change over from one setting to the other than the time required for the disc 319 to move half a tooth-pitch even if the contacts cannot remain in mid-position.

It will be understood that the escapement mechanism has a wide range of applications and may be employed to step round any part which is to be moved at a rate determined by the rate of a series of electrical impulses derived from any suitable source.

I claim:

1. An electro-magnetic escapement mechanism comprising a rotatable toothed wheel, means biasing said wheel to rotate continuously in one direction, two electro-magnets mounted adjacent the periphery of the wheel so that the poles of either one magnet register with teeth of the wheel which forms part of the magnetic circuit of that magnet and the poles of the other magnet register concurrently with tooth-spaces of the wheel, said magnets having sufficient power to hold said toothed wheel against rotation by said biasing means, two resistances connected in series respectively with the two magnets and a change-over contact device connected in parallel with the resistances to short-circuit one or the other of them and operable to short circuit them alternately.

2. An electromagnetic escapement mechanism comprising a rotatable toothed wheel, means biasing said wheel to rotate continuously in one direction, two electro-magnets mounted adjacent the periphery of the wheel so that the poles of either one magnet register with teeth of the wheel which forms part of the magnetic circuit of that magnet and the poles of the other magnet register concurrently with tooth-spaces of the wheel, said magnets having sufficient power to hold said toothed wheel against rotation by said biasing means, two resistances connected in series respectively with the two magnets, a change-over switch connected in parallel with the resistances and arranged to short-circuit one or other of them alternatively, according to its setting, two electromagnets and a steel armature which is common to both magnets, which is pivotally mounted so that it is rocked one way by one magnet and the other way by the other magnet and is held by residual magnetism by whichever magnet was last energised until the other is energised and which is so connected to the change-over switch as to reverse the setting thereof each time it is rocked.

3. An electromagnetic escapement mechanism comprising a rotatable toothed wheel, an induction motor biasing it to rotate it continuously in one direction, two electromagnets mounted adjacent the periphery of the wheel so that the poles of either one magnet register with teeth of the wheel which forms part of the magnetic circuit of that magnet and the poles of the other magnet register concurrently with tooth-spaces of the wheel, said magnets having sufficient power to hold said toothed wheel against rotation by said induction motor, a resistance in series with the induction motor, a relay arranged when energized to short circuit said resistance and open the circuit to the electromagnets cooperating with the toothed wheel, means for energizing the relay at the time when the mechanism is to be reset to a predetermined position, circuit means associated with the relay to maintain the relay energized after energization by the aforesaid means for energizing the relay, and a contact device driven by the toothed wheel and arranged to de-energize the relay when the mechanism is in the predetermined position.

4. An electromagnetic escapement mechanism comprising a rotatable toothed wheel, an induction disc rotatable with the wheel, electromagnets cooperating with the induction disc to rotate it continuously in one direction when energized by alternating current, two electromagnets mounted adjacent the periphery of the wheel so that the poles of either one magnet register with teeth of the wheel which forms part of the magnetic circuit of that magnet and the poles of the other magnet register concurrently with tooth-spaces of the wheel, said magnets having sufficient power to hold said toothed wheel against rotation by said induction disc, a braking electromagnet cooperating with the induction disc to retard its rotation when energized by direct current, a relay arranged when energized to de-energize the braking magnet cooperating with the induction disc and the electromagnets cooperating with the toothed wheel, means for energizing the relay at the time when the mechanism is to be reset to a predetermined position, circuit means associated with the relay to maintain the relay energized after energization by the aforesaid means for energizing the relay, and means driven by the toothed wheel and operable to de-energize the relay when the mechanism is in the predetermined position.

5. An electromagnetic escapement mechanism comprising a rotatable toothed wheel, means biasing said wheel to rotate continuously in one direction, two electromagnets mounted adjacent the periphery of said wheel so that the poles of either one magnet register with teeth of the wheel which forms part of the magnetic circuit of that magnet and the poles of the other magnet register concurrently with tooth-spaces of the wheel, said magnets having sufficient power to hold said toothed wheel against rotation by said biasing means, a rotatable part, a reduction gear train by which the toothed wheel drives the rotatable part, a relay arranged when energized to de-energize both electromagnets cooperating with the toothed wheel, means for energizing the relay at the time when the rotatable part is to be re-set to a predetermined position, circuit means associated with the relay to maintain the relay energized after energization by the aforesaid means for energizing the relay and a contact device, operated by the rotatable part when it reaches the predetermined position, to de-energize the relay.

BERNARD ANDRÉ VUILLE.

REFERENCES CITED

The following references are of record in the file of this patent:

UNITED STATES PATENTS

| Number | Name | Date |
| --- | --- | --- |
| 1,015,968 | Lehr | Jan. 30, 1912 |
| 1,753,331 | Clokey | Apr. 8, 1930 |
| 1,849,645 | Stoller | Mar. 15, 1932 |
| 2,099,982 | Koenig | Nov. 23, 1937 |
| 2,199,910 | Cunningham | May 7, 1940 |
| 2,249,029 | Mullerheim | July 15, 1941 |
| 2,351,508 | Hamilton | June 13, 1944 |
| 2,393,192 | Ruehrmund | Jan. 15, 1946 |

FOREIGN PATENTS

| Number | Country | Date |
| --- | --- | --- |
| 11,995 | Denmark | Mar. 19, 1909 |